(12) United States Patent
Ponzo et al.

(10) Patent No.: US 6,746,651 B1
(45) Date of Patent: Jun. 8, 2004

(54) AXIAL FLOW CATALYST PACK

(75) Inventors: James B. Ponzo, Rocklin, CA (US); Robert C. Schindler, Rancho Murrieta, CA (US); Hans Harry Mueggenburg, Carmichael, CA (US)

(73) Assignee: Aerojet-General Corporation, Sacramento, CA (US)

( * ) Notice: Subject to any disclaimer, the term of this patent is extended or adjusted under 35 U.S.C. 154(b) by 0 days.

(21) Appl. No.: 09/371,973

(22) Filed: Aug. 10, 1999

(51) Int. Cl.[7] .............................. B01J 35/02; B01J 8/02; B01J 8/04
(52) U.S. Cl. .................. 422/220; 422/211; 422/217; 422/220
(58) Field of Search .................. 422/211, 213, 422/217, 218, 220; 48/61, 76, 127.1

(56) References Cited

U.S. PATENT DOCUMENTS 3,535,879 A * 10/1970 Kuntz ...................... 60/200.1
5,270,127 A * 12/1993 Koga et al. .................... 429/17
5,690,763 A * 11/1997 Ashmead et al. ............. 156/60
6,183,703 B1 * 2/2001 Hsu et al. .................... 422/211

* cited by examiner

Primary Examiner—Jerry D. Johnson
Assistant Examiner—Alexa Doroshenk
(74) Attorney, Agent, or Firm—M. Henry Heines; Townsend and Townsend and Crew LLP

(57) ABSTRACT

A stack of very thin metal plates provides high surface area for catalytic decomposition of a fluid flowing axially from upstream to downstream through the stack. Each plate has flow-through passages of selected size and location to promote uniform flow and good surface contact with a catalyst surface on the plates. The downstream surface of each plate is etched to provide gaps between plates for lateral fluid flow. The plates are divided into groups separated by metering plates that promote more uniform flow from group to group.

17 Claims, 5 Drawing Sheets

AXIAL FLOW CATALYST PACK

FIELD OF THE INVENTION

The present invention relates generally to apparatus for catalytic decomposition of monopropellant fuels and more specifically to a plurality of stacked thin metal plates having precise flow passages to provide selected uniform flow characteristics across each plate while promoting thorough catalytic surface contact with well mixed monopropellant.

PRIOR ART

Catalytic decomposition of monopropellant fuels, i.e., H2O2 and N2H4, requires the use of a transitional metal catalyst to initiate and sustain decomposition. Catalyst beds are designed to supply large surface areas of catalytic substance and thorough mixing of the monopropellant to facilitate complete decomposition. A peroxide catalyst bed typically uses silver screen packs, while a N2H4 system typically consists of iridium deposited on alumina granules. Extruded ceramic cores have also been employed.

In all instances the catalyst was applied to an aggregate material. These materials are subject to wear and are relatively fragile (the alumina granules), and do not possess a consistent flow resistance (stacked screens). The uneven flow resistance leads to localized flow restrictions which result in recirculation of the decomposed flow, unpredictable start/stop behavior and unpredictable pressure drop through the pack. The extruded ceramic cores provide straight through passages that do not promote mixing of the monopropellant, thus limiting the catalytic surface contact.

Examples of prior art catalyst beds are found in issued U.S. Pat. Nos. 3,535,879; 4,211,072; 4,517,798; 4,856,271; 4,938,932; and 5,531,968. A further example of a conventional catalyst bed is discussed below in conjunction with FIG. 4 of the accompanying drawings.

SUMMARY OF THE INVENTION

The invention provides a bonded stack of very thin metal plates, referred to as platelets, that provide very high surface area per unit of volume and precise flow passages or holes in a given cross section, resulting in high, stable and repeatable performance. Because the flow passages are precisely photo etched, the flow restriction and therefore the flow rate is uniform across each platelet. Also, by varying the diameter of the etched holes, the fraction of the cross section that is open on a given platelet can be precisely designed to give the fluid the desired pressure drop and volume to expand.

The platelets are segregated into distinct groups separated from one another by a metering platelet. Each metering platelet has slightly smaller flow passages than the groups preceding and following. This "restriction" will inhibit the formation of hot spots by recirculation due to non-uniform flow in an upstream group. Good fluid mixing is promoted by offsetting passages from platelet to platelet. Larger and less frequent flow passages may be used instead of smaller flow passages in the metering platelet as long as the total flow-through area is less than the platelets in the adjacent groups.

OBJECTS OF THE INVENTION

It is therefore a principal object of the present invention to provide a catalyst bed comprising a stacked plurality of contiguous thin metal plates having flow-through holes of selected size and at selected locations to promote uniform flow of a fluid through the bed.

It is another object of the present invention to provide a catalyst bed having a generally cylindrical configuration and designed to promote uniform mixing and efficient catalyst contact of a fluid flowing axially through the bed.

It is still another object of the invention to provide a catalyst bed formed from a stacked array of thin metal plates having catalyst material surfaces and axial flow-through holes and being segregated into a plurality of groups of such plates, each such group being separated from adjacent groups by a metering plate having a smaller flow area.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 2, comprising

DETAILED DESCRIPTION OF A PREFERRED EMBODIMENT

Figure 1:
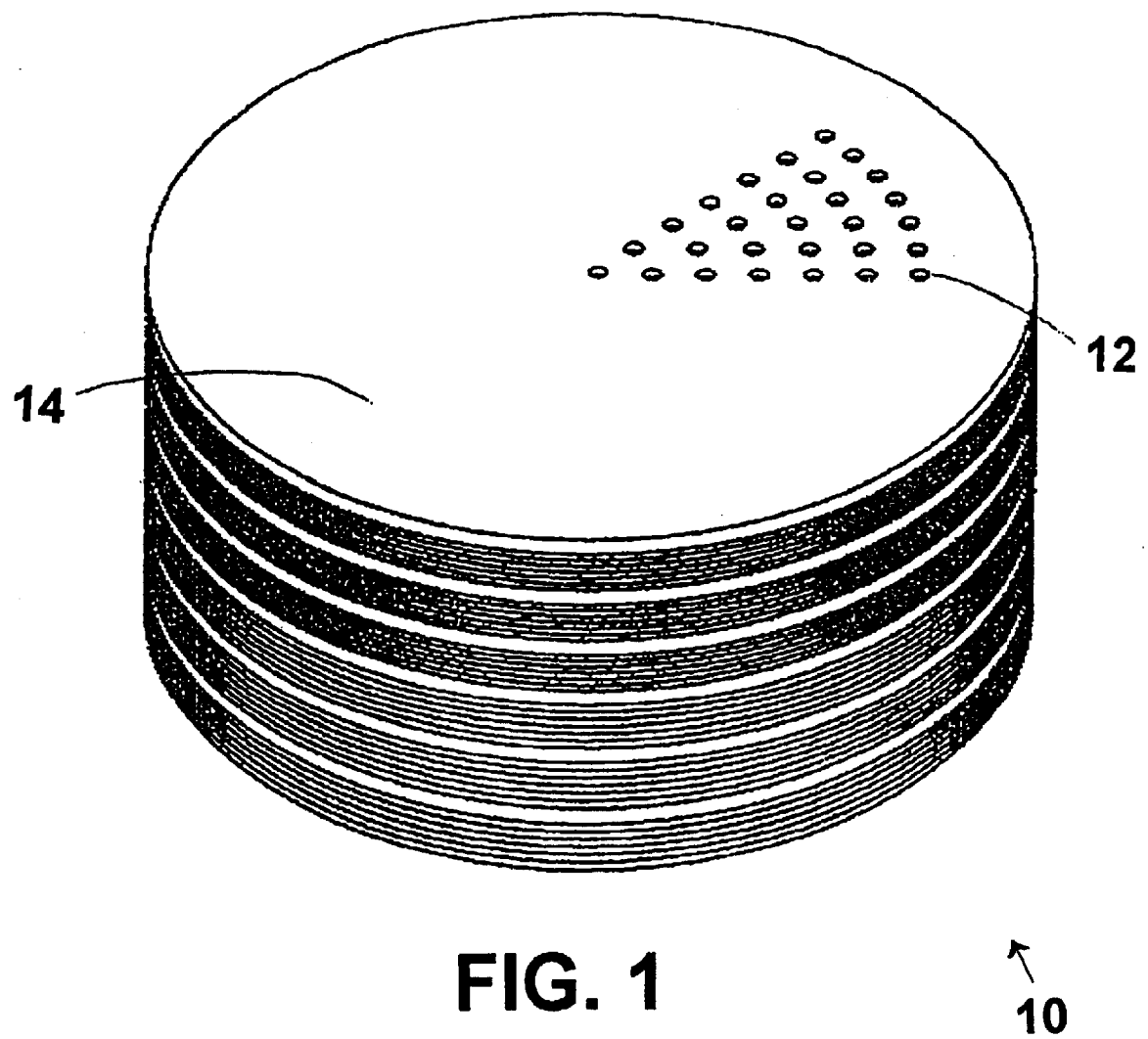
FIG. 1 is a three-dimensional view of an axial flow catalyst pack in accordance with a preferred embodiment of the present invention.
Figure 2A:
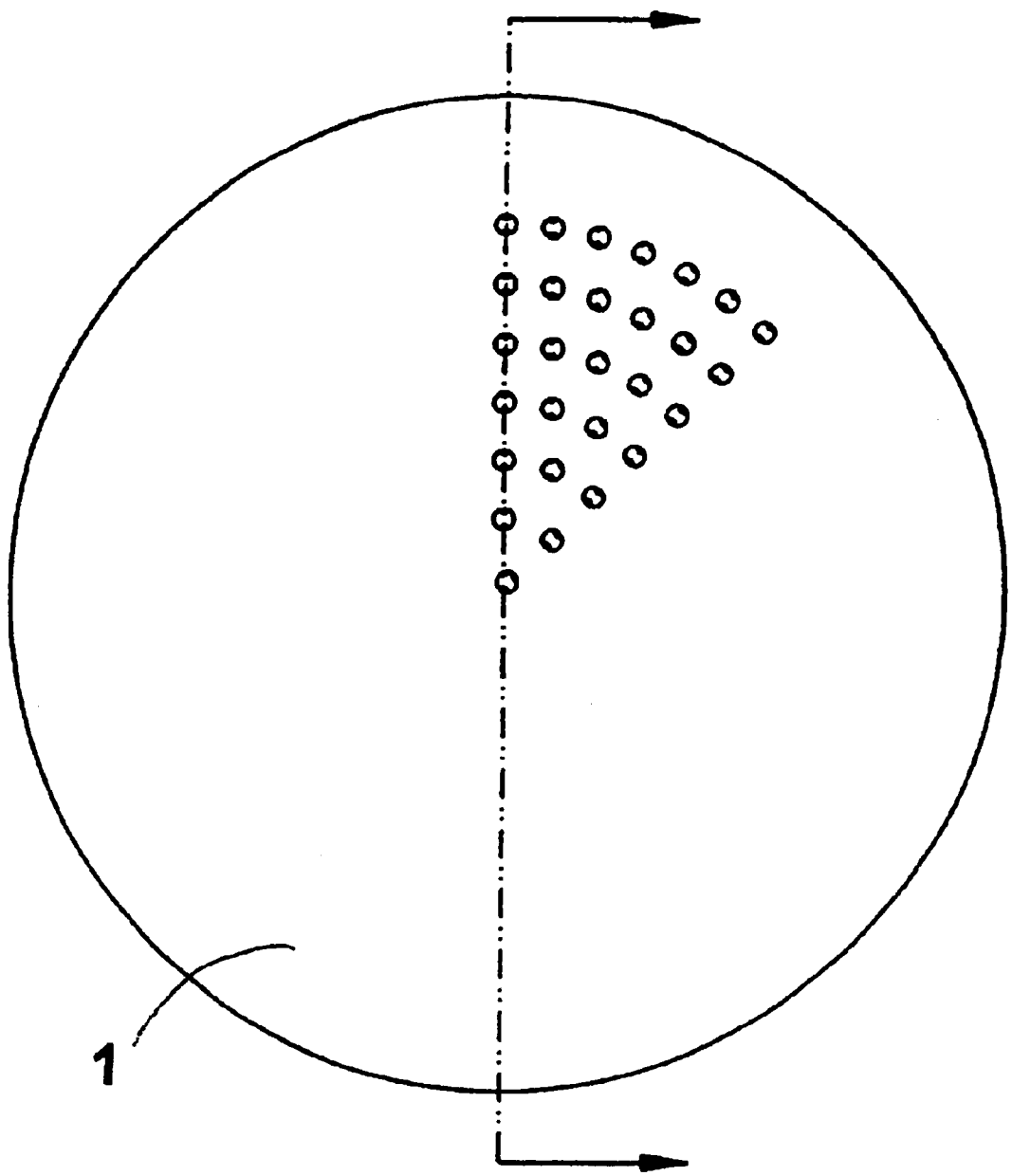
FIGS. 2a, 2b and 2c, illustrates respectively an elevational view of the stack of FIG. 1, a cross-sectional view thereof and a greatly enlarged detailed view of a portion thereof.
Figure 2B:
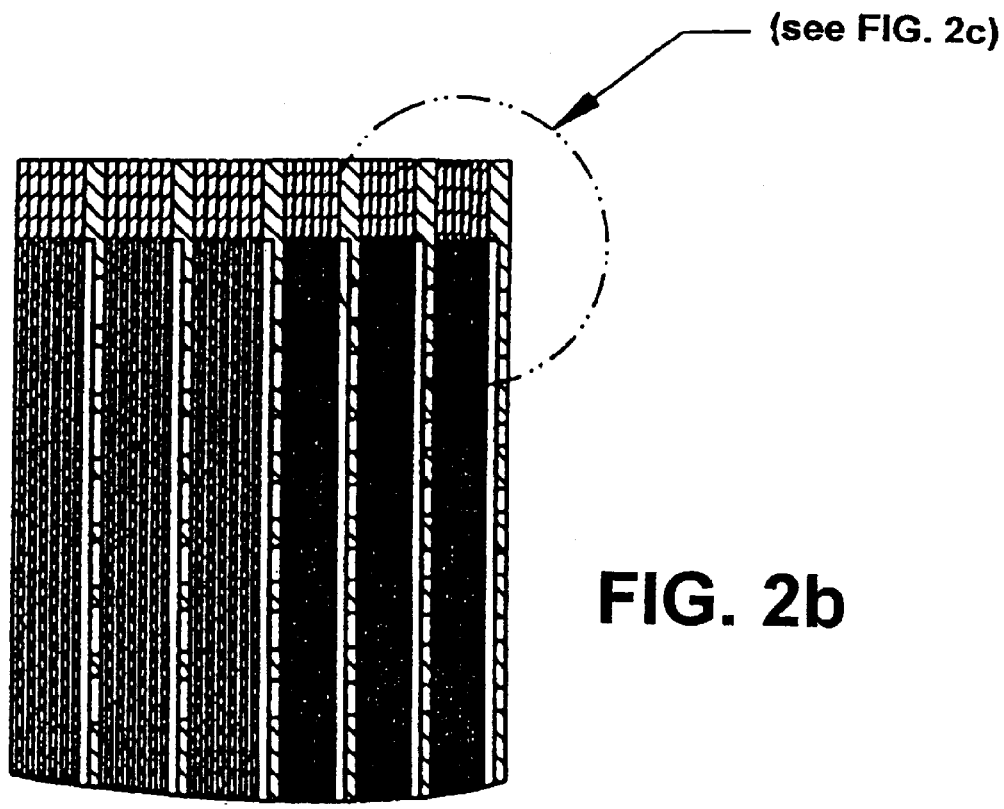
Figure 2C:
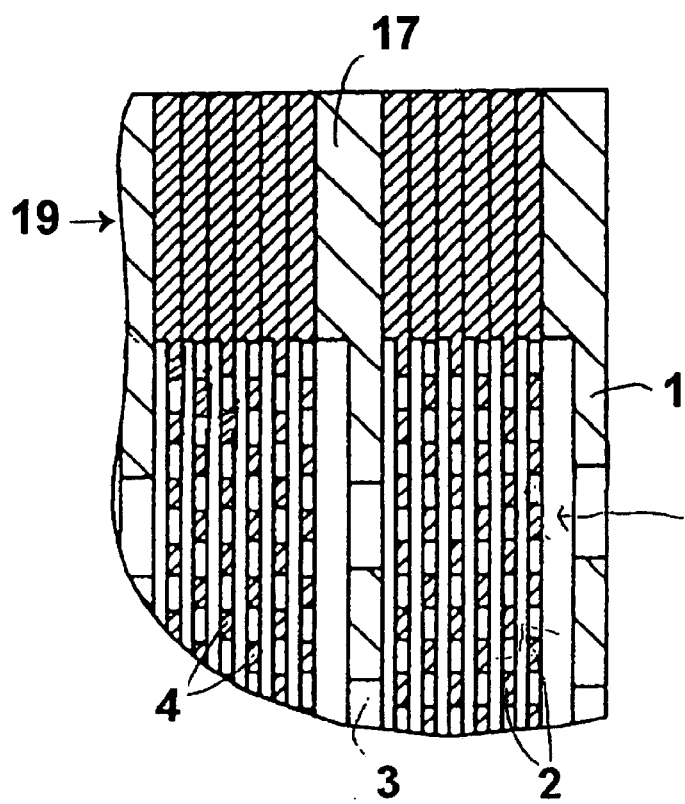
Figure 3:
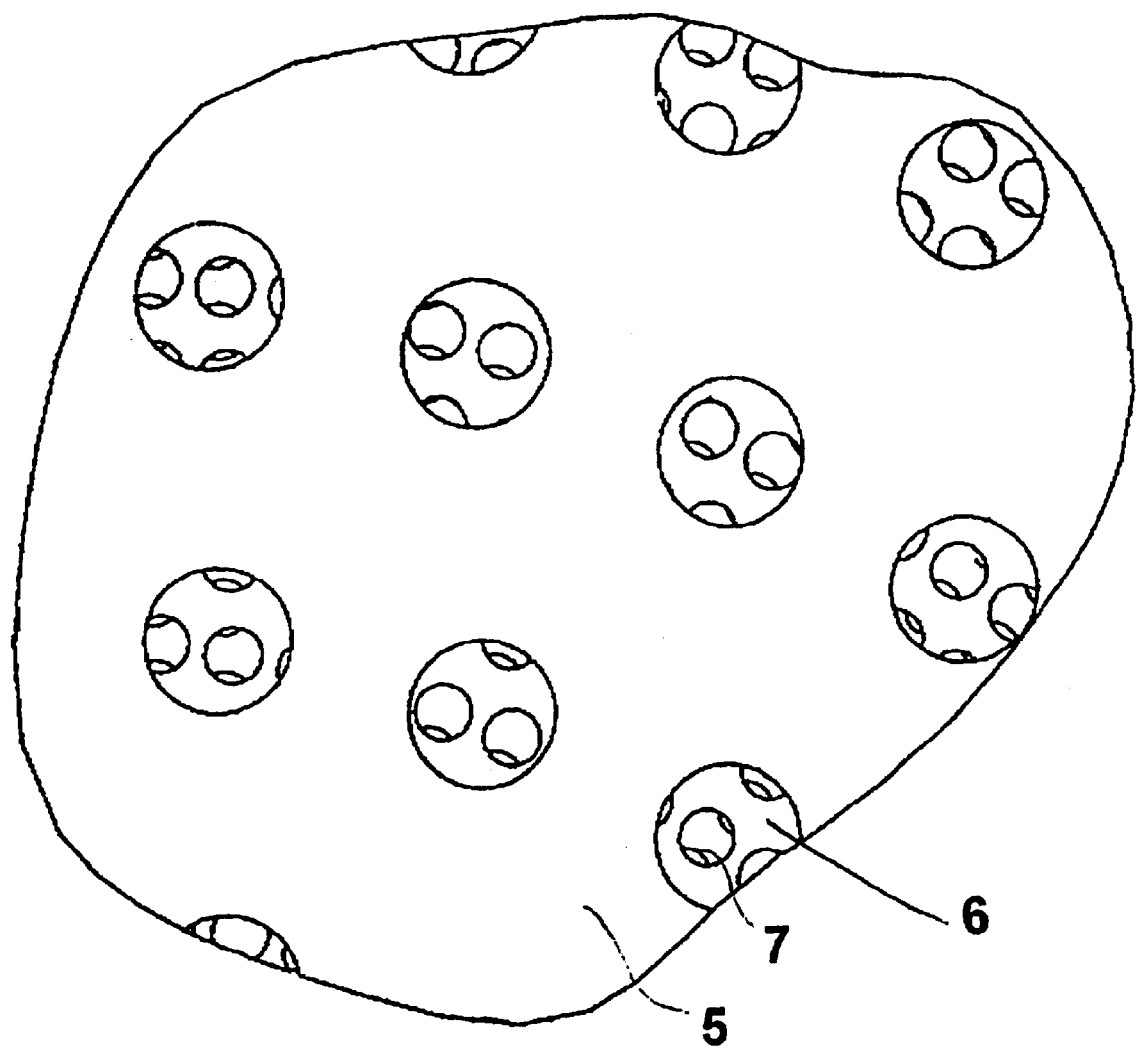
FIG. 3 is an enlarged top view of the stack of FIG. 1 illustrating the relationship of flow passages in respective plates thereof.

The axial flow platelet fabricated catalyst bed 10 shown in FIG. 1 uses precise thru-etched openings 12 in each platelet 14 so that the flow can "diffuse" from the inlet platelet to each succeeding platelet. Passage cross sectional areas can be tailored by increasing the proportion of the platelet that is open and thereby the passage cross sectional and surface area can increase as the flow gasifies. This is illustrated in FIG. 2 which shows the flow path of the monopropellant through the inventive catalyst bed. The flow passes through a metering plate 1 to distribute the monopropellant uniformly across the catalyst bed and then passes through a secession of "surface enhancement" plates 2 that have a large catalytic surface area and the desired open area ratio. Then the flow passes through another metering platelet 3 and "surface enhancement" platelet group 4. Each succeeding metering platelet's fraction of open area will be greater than the previous metering platelet and less than the surface enhancement surface area and fraction open area ratio, the majority of the decomposition takes place in this region. Another view of the layout is shown in FIG. 3. From this top view the relationship of the metering plate 5 to the surface enhancement plates 6 and 7 can be seen. The metering holes are larger but less frequent than the following surface enhancement holes. Alternatively, the metering holes may be of equal frequency but smaller than the enhancement holes. The first and second surface enhancement plates are identical except for the placement of the holes which are offset in respective plates to force mixing of the flow.

Figure 4:
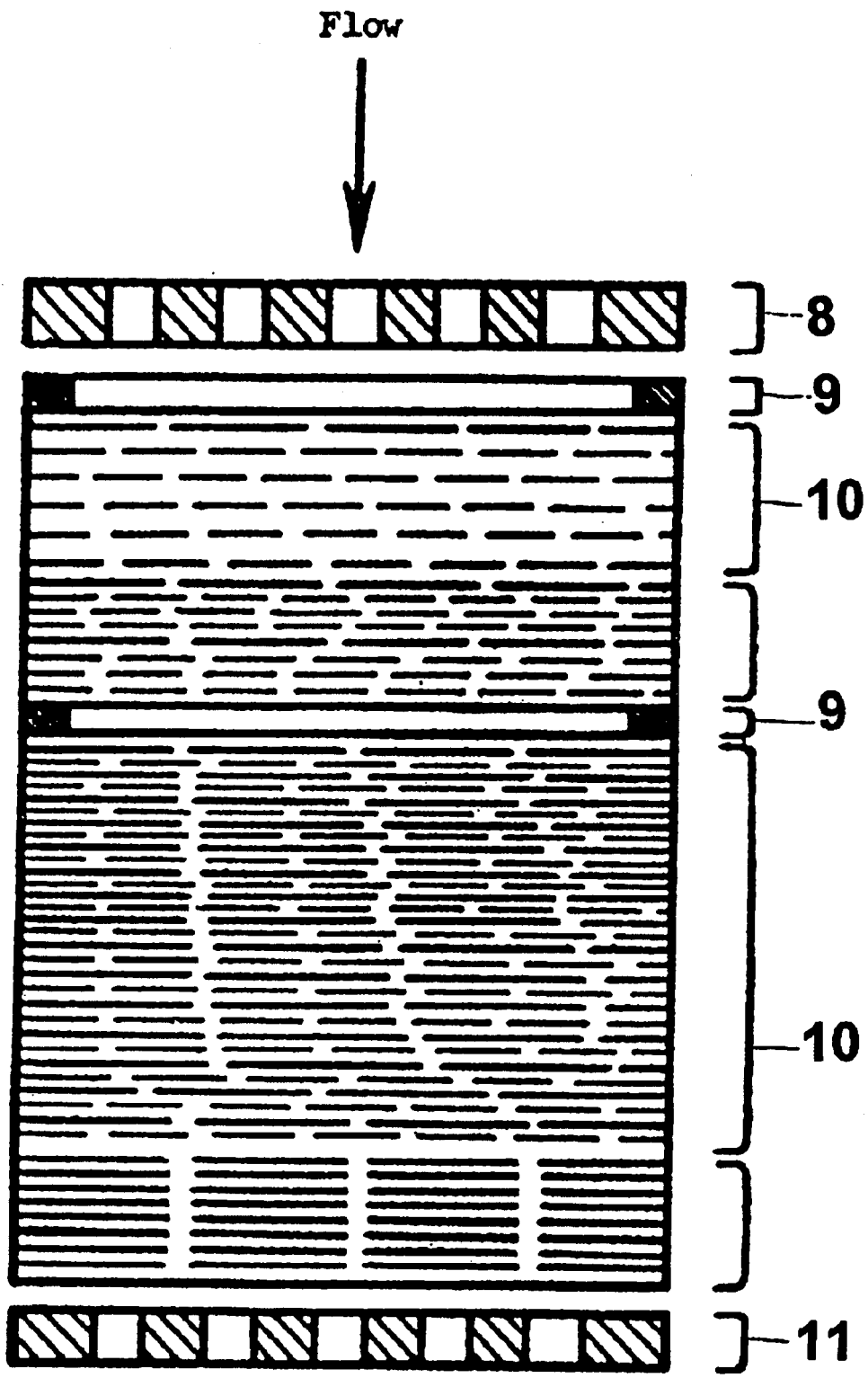
FIG. 4 is a cross-sectional view of a prior art axial flow catalyst bed.

An equivalent axial flow catalyst bed that uses current state-of-the-art technology is shown in FIG. 4. This multiple piece assembly contains a catalyst bed consisting of an aggregate of distribution and support plates and screens made from stainless steel, nickel, silver wire, and silver plated nickel or brass wire. It contains a propellant distribution plate 8, antichannel baffle 9, catalyst bed 10 and support plate 11. The axial flow catalyst bed that decomposes propellants such as hydrogen peroxide (H2O2) and hydrazine (N2H4) is unable to compensate for the increase in the volume of the effluent as it converts from liquid to superheated gas. This has been countered by arranging the flow path for a radial direction that takes advantage of the bed size increase as the flow proceeds from a central core to a peripheral outlet., However, it results in an assembly that is both complex and costly.

Due to the high percentage of open area in the axial flow platelet catalyst bed, the flow restriction will be small. Since decomposition will most likely not happen in a totally uniform manner, the pack could become prone to the same problems as a screen pack, namely, recirculation of the decomposed products and the resulting hot spots. The intermittent metering plates keep this phenomenon from developing. These plates have a lower fraction open area than the surface enhancement plates that precede and follow. This results in a restriction that will isolate each group of surface enhancement plates from the others. Any hot spot/recirculation zone will be unable to propagate throughout the stack. The metering platelets will also act as flow distributors to keep the flow uniform across the bed which will avoid the initiation of the recirculation zones.

All platelets are depth etched on the downstream side to allow lateral flow to occur between platelets. Thru-etched axial holes are uniformly spaced across the entire platelet but are offset in alternate platelets to preclude pure axial flow. By offsetting the holes, the fluid is forced to impinge on the catalyst of each platelet before traversing 360 degrees sideways to exit through the next platelet holes where the process repeats. This continuous turning of the fluid promotes turbulence in the monopropellant and assures that the monopropellant makes continuous contact with the catalyst.

The depth etched portion of each platelet incorporates islands 17 that are not etched. These islands are located in each platelet at identical locations so that when the platelets are assembled they form solid vertical columns 19 throughout the stack to provide structural integrity to the catalyst bed.

The platelets can be, but are not limited to pure catalytic material (i.e., silver or platinum). They can be bonded or unbonded, or may be a catalytic material plated on a stronger material (i.e., silver plated onto nickel). The materials may also vary throughout the stack. High concentrations of peroxide for example decompose at a temperature higher than silver's melting temperature. Silver platelets, or silver coated platelets may be used only for the first portion of the bed, where the decomposition is initiated. However, as the temperature increases above silver's melting temperature the remainder of the plates would be made of a high temperature material such as nickel. This will allow sustained operation at elevated temperatures without degradation of the pack.

The platelet stack catalyst bed which is the preferred embodiment of this invention, can operate as a monolithic platelet stack or as an unbonded stack. The latter has a distinct advantage during development testing whereas the former could serve as a very lightweight integrated assembly. For development testing individual platelets would be stacked in a housing. Because there is little compliance compared to a screen catalyst bed, high compressive forces would not be required, i.e., the platelets only have to bottom out on each other.

Having thus disclosed a preferred embodiment of the invention, it being understood that the embodiment is merely exemplary of the underlying concepts of the invention and that other embodiments which utilize such concepts in a different form are also contemplated.

What we claim is:

1. A catalyst bed for decomposition of monopropellant fuel using a transition metal catalyst over which the fuel is made to flow, the bed comprising:

a plurality of thin metal plates in a stacked contiguous relation, each such plate having a surface of catalytic material and a plurality of flow-through holes of selected size and location for flow of said fuel axially through said stacked plates, said flow-through holes being axially offset from plate to plate to promote lateral flow of said fuel between adjacent plates, at least a portion of each such plate on a downstream side being etched to direct said lateral flow in all directions between flow-through holes of adjacent plates.

2. The catalyst bed recited in claim 1 wherein said plurality of plates comprises a plurality of groups of said plates, each said group being separated by a metering plate having flow-through holes that provide reduced open area compared to the flow-through holes of said adjacent groups of said plates.

3. The catalyst bed recited in claim 2 wherein each said metering plate which is positioned more downstream of an upstream metering plate comprises larger flow-through holes than said upstream metering plate.

4. The catalyst bed recited in claim 1 wherein said etched downstream side of each said plate comprises unetched portions forming support columns for supporting each said plate on an adjacent said plate.

5. The catalyst bed recited in claim 1 wherein said metal plates are substantially circular.

6. The catalyst bed recited in claim 1 wherein said metal plates are bonded to one another to form a monolithic stack.

7. A catalytic converter for promoting the decomposition of a liquid fuel into a gas, the converter comprising:

a plurality of thin metal plates having a surface formed of a catalyst material and stacked axially along a flow path of said fuel form upstream to downstream; each said plate having a plurality of flow-through holes leading from its upstream surface to its downstream surface, said flow-through holes being axially offset from plate to plate to promote lateral flow of said fuel between adjacent plates, the downstream surface of each said plate being at least partially removed to promote said lateral flow in all directions between flow-through holes of adjacent plates.

8. The catalytic converter recited in claim 7 wherein said plurality of plates comprises a plurality of groups of said plates, each said group being separated from adjacent said groups by a metering plate having flow-through holes that provide reduced open area as compared to the flow-through holes of said adjacent groups of said plates.

9. The catalytic converter recited in claim 8 wherein each said metering plate which is positioned more downstream of an upstream metering plate comprises larger flow-through holes than said upstream metering plate.

10. The catalytic converter recited in claim 7 wherein said etched downstream side of each said plate comprises unetched portions forming support columns for supporting each said plate on an adjacent said plate.

11. The catalytic converter recited in claim 7 wherein said metal plates are substantially circular.

12. The catalytic converter recited in claim 7 wherein said metal plates are bonded to one another to form a monolithic stack.

13. A catalyst bed comprising:

a generally cylindrical array of catalyst material the axis of which is substantially parallel to the direction of flow of a fluid through said bed, the catalyst material being configured as the surface material of a plurality of stacked, contiguous, thin metal plates having axial flow-through holes of selected size and location to promote uniform flow and contact of said fluid with said catalyst material, said flow-through holes being axially offset from plate to plate to promote lateral flow of said fuel between adjacent plates, at least a portion of each said thin metal plate on a downstream side is removed to provide a gap between adjacent plates to promote said lateral flow in all directions between flow-through holes of adjacent plates.

14. The catalyst bed recited in claim 13 wherein said plates are segregated into a plurality of groups of said plates and wherein each said group is separated from an adjacent group by a metering plate having flow-through holes the total area of which is less than the total area of the flow-through holes in said plates of said groups.

15. The catalyst bed recited in claim 14 wherein each said metering plate which is positioned more downstream of an upstream metering plate comprises larger flow-through holes than said upstream metering plate.

16. The catalyst bed recited in claim 13 wherein said removed portion of each said plate comprises unremoved portions forming support columns for supporting each said plate on an adjacent said plate.

17. The catalyst bed recited in claim 13 wherein each said plate is characterized by an open area ratio which is defined as the combined area of the flow-through holes divided by the total area of the plate and wherein the open area ratio of said plates generally increases along said direction of flow.

* * * * *